Jan. 17, 1928.

R. J. GITS 1,656,628

POWER TRANSMISSION BELT

Filed April 18, 1927

Witnesses
Arthur M. Framke
Wm. E. Hann

Inventor
Remi J. Gits
By Rummler & Rummler
Attys.

Patented Jan. 17, 1928.

1,656,628

UNITED STATES PATENT OFFICE.

REMI J. GITS, OF CHICAGO, ILLINOIS.

POWER-TRANSMISSION BELT.

Application filed April 18, 1927. Serial No. 184,748.

The main objects of this invention are to provide an improved form of power transmission belt which has a maximum amount of tractive bearing surface for the width of the belt; and to provide a transmission belt of this type which will provide for lateral expansion so that it will readily conform to the belt pulleys upon which it is adapted to work.

An illustrative embodiment of this invention is shown in the accompanying drawings in which.

Figure 1:
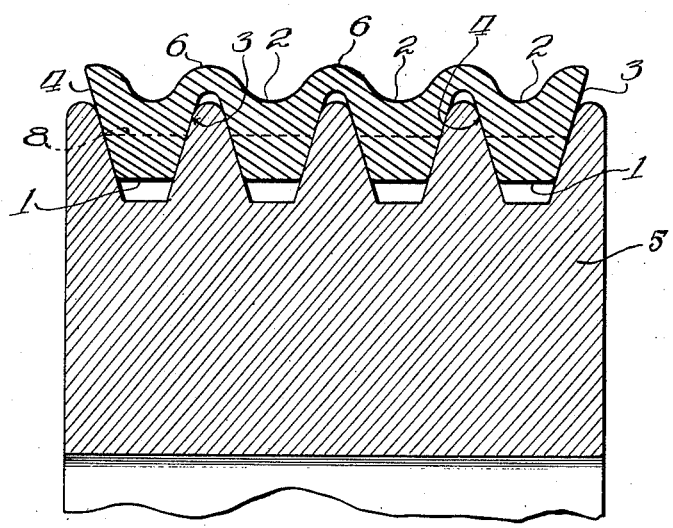
Figure 1 is a transverse section of the belt and a portion of the belt pulley upon which it travels.
Figure 2:
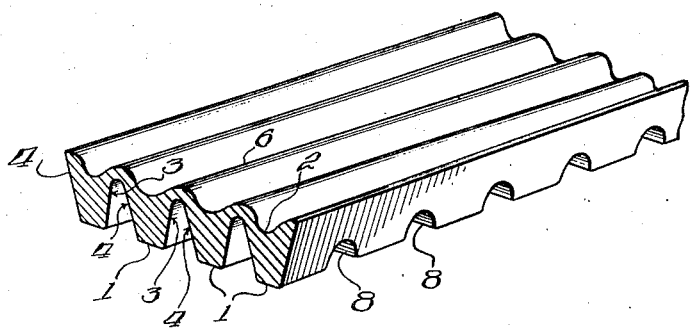
Fig. 2 is a view in perspective of a section of the improved type of belt showing the transverse notches formed in the face of the longitudinal ribs.

Heretofore power transmission belts of this general character have been made having a single V-shaped solid rib and also in some instances a plurality of these V-shaped ribs have been joined together by links and the like to form a belt of larger size and greater power. Neither type has been successful and consequently have been put to very little commercial use.

In the present invention, the belt is woven in a single piece with the bearing face provided with a plurality of longitudinal extending ribs that are V-shaped in cross section and the opposite face of the belt is provided with a corresponding number of grooves that extend down into the backs of the ribs. That part of the belt which joins the ribs to each other is arcuate in cross section and flexible or pliable enough so that the spacing between centers of the ribs can vary considerably and still allow each individual rib to properly fit and conform to its groove in the outer periphery of the pulley wheel.

The width of the pulley wheel grooves upon which this belt is adapted to run is preferably slightly less than the width of the ribs on the belt and when power is applied to the belt, the grooves which extend down into the backs of the ribs, permit the ribs to be compressed and secure a very tight wedging fit on the pulley wheel. In this manner, a belt that is quite loose can be run on pulley wheels, pulling its maximum amount of power without any slippage.

In the construction shown in the drawings, the belt is made of one piece, woven fabric, impregnated with rubber and is formed on its bearing face side with a plurality of ribs 1 which are V-shaped in cross section and the opposite side of the belt is provided with a corresponding number of longitudinal grooves 2 which extend down into the backs of the ribs 1 so that the side walls 3 and 4 may spring toward each other and thus secure a very tight wedging friction hold on a pulley wheel 5.

That portion of the belt 6 which connects the ribs 1 is preferably of inverted U-shape or arcuate in cross section and is flexible or pliable so that the distance between centers of the ribs 1 may vary considerably to compensate for variations in the distance between the centers of the pulley wheels upon which the belt is adapted to work.

A belt constructed in this manner permits each individual rib to fit itself independently of the others into the grooves of the pulley wheels in such manner that each rib will automatically exert the same amount of traction on the pulley wheels.

In order to provide easy bending of the belt around small pulley wheels, the faces of each of the ribs 1 are provided with a plurality of transverse notches 8 so that the inner face of the ribs may be pressed in turning around the pulley wheel without exerting too great a pressure on the outer face of the belt as is well understood in the art.

In the use of this belt, the pulley wheels upon which it is to run are provided with a plurality of peripheral grooves to receive the ribs on the bearing side of the belt and the relative sizes of the pulley wheel grooves and belt ribs are so proportioned that when the belt is new, the lower ends of the ribs will be spaced above the bottoms of the grooves on the pulley wheel as shown in the drawings. As the belt wears and the pulley wheel wears, the ribs will gradually fit down further into the grooves in the pulley wheel.

The backs of the ribs, being provided with grooves extending down thereinto, cause the side walls of the ribs to have a spring wedging action against the side walls of the pulley wheel upon which it runs and the greater the pull to which this belt is subjected, the tighter it will wedge itself into the grooves of the pulley wheels.

The connecting portions 6 between the ribs being flexible or pliable, permit considerable variation in spacing of the grooves in the pulley wheel without detracting from the individual fit or adjustment of each of the ribs into its respective groove.

The combination of the flexible side wall ribs and the pliable connecting portions result in a very efficient long life belt.

Although but one specific embodiment of this invention has been herein shown and described, it will be understood that numerous details of the construction shown may be altered or omitted without departing from the spirit of this invention as defined by the following claims.

I claim:

1. A woven fabric and rubber transmission belt having a plurality of longitudinally disposed V-shaped ribs on the bearing surface thereof, the outer surface of said belt being provided with grooves extending down into the backs of said ribs to impart flexibility to the side walls thereof, the portion of said belt intermediate said ribs being arcuate in cross section and flexible.

2. A woven fabric and rubber transmission belt having a plurality of longitudinally disposed V-shaped ribs on the bearing surface thereof, the outer surface of said belt being provided with grooves extending down into the backs of said ribs to impart flexibility to the side walls thereof, the portion of said belt intermediate said ribs being arcuate in cross section and flexible, each of said ribs being provided with a plurality of transverse notches in the face thereof for the purpose set forth.

3. A woven fabric and rubber transmission belt having a plurality of longitudinally disposed V-shaped ribs on the bearing surface thereof, the portion of said belt intermediate said ribs being arcuate in cross-section and flexible to permit individual lateral adjustment of the ribs relative to one another.

4. A woven fabric and rubber transmission belt having a plurality of longitudinally disposed V-shaped ribs on the bearing surface thereof, the portion of said belt intermediate said ribs being flexible and extensible to permit individual lateral adjustment of the ribs relative to one another.

Signed at Chicago this 15th day of April, 1927.

REMI J. GITS